United States Patent [19]

Dean et al.

[11] Patent Number: 5,029,626
[45] Date of Patent: Jul. 9, 1991

[54] OVERLOAD PROTECTION SYSTEM FOR CHIP SLICERS AND OTHER MACHINES

[75] Inventors: Donald A. Dean, Marysville; Adrian Artiano, Mukilteo; Gabriel M. Terrenzio, Seattle, all of Wash.

[73] Assignee: Acrowood Corporation, Everett, Wash.

[21] Appl. No.: 461,234

[22] Filed: Jan. 5, 1990

[51] Int. Cl.5 .......................... B02C 2/04; B27C 1/00
[52] U.S. Cl. ................................ 144/176; 144/162 R; 144/373; 241/32; 241/92; 74/665 R
[58] Field of Search .................. 144/162 R, 172, 174, 144/176, 373; 74/665 R, 665 B, 665 G; 241/32, 92, 278 R, 207, 208, 215

[56] References Cited

U.S. PATENT DOCUMENTS

| | | | |
|---|---|---|---|
| 3,000,577 | 9/1961 | Ferguson | 241/32 |
| 3,887,143 | 6/1975 | Gilbert et al. | 241/215 |
| 4,770,217 | 9/1988 | Strong | 144/176 |
| 4,827,989 | 5/1989 | Strong | 144/176 |
| 4,892,257 | 1/1990 | Stoeckmann et al. | 241/32 |

Primary Examiner—W. Donald Bray
Attorney, Agent, or Firm—Seed and Berry

[57] ABSTRACT

The anvil rotor on a wood chip slicing machine is connected to its drive shaft via shear pins which extend into the hub of the rotor from a coupling which is mounted on the shaft. The coupling provides bearings for rotation of the rotor hub thereon when the shear pins are sheared as a consequence of an overload or load shock condition. The overload protection mechanism is applicable to other machines.

19 Claims, 4 Drawing Sheets

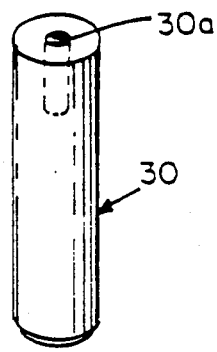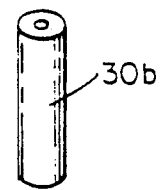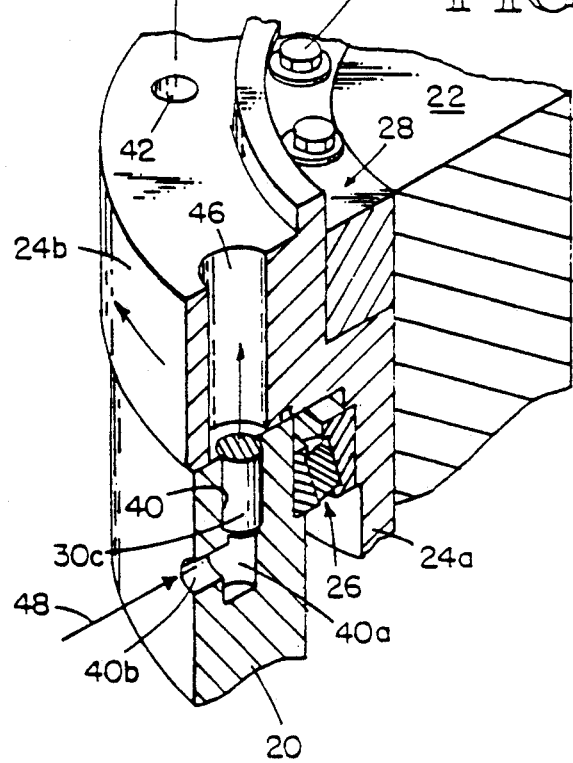
FIG.4    FIG.5

OVERLOAD PROTECTION SYSTEM FOR CHIP SLICERS AND OTHER MACHINES

TECHNICAL FIELD

The present invention relates to systems for preventing damage to chip slicers and other machines from overload or load shock conditions created, for example, by jamming of the mechanism by foreign objects in the material being processed.

BACKGROUND OF THE INVENTION

Wood chip slicers commonly are of a design having an outer rotating drum with chip-cutting knives mounted therein adjoining discharge openings and having an inner anvil rotor rotating in the same direction as the drum but at a higher r.p.m. The rotor has several radial arms carrying anvils which push chips held by centrifugal force against the inside face of the drum into contact with the knives so that they are sliced, whereupon the chip slices pass outwardly through the discharge openings in the drum.

Foreign material, such as rocks and pieces of metal, are sometimes present in the wood chip material being processed and become lodged between an anvil and a knife in the slicer. The resulting jamming condition between the anvil rotor and the drum is capable of severely damaging the mechanism unless overload protection is provided. Past attempts have involved use of relatively costly pressurized units mounted on the drive shaft of the anvil rotor and designed to vent, and thereby disconnect the shaft from the anvil rotor, when subjected to a preset overload condition.

SUMMARY OF THE INVENTION

The present invention aims to provide an improved overload protection system which is reliable and of relatively simple construction, can be easily installed and reactivated, and can be readily adjusted as to the magnitude of overload for activating the system.

The overload protection system of the invention utilizes shear pins which transfer the load from the drive shaft to the anvil rotor. A coupling is mounted, as by an expansion ring, on the drive shaft and provides bearings on which the hub of the anvil rotor can rotate if the shear pins are sheared. The pins extend parallel to the rotary axis of the drive shaft and are lodged in holes passing through a head flange on the coupling into holes in the hub of the rotor. Provision is made for easy removal of the shear pin sections resulting from shearing of the pins. The number of shear pins used can be varied in accordance with the operating conditions.

BRIEF DESCRIPTION OF THE DRAWINGS

FIG. 4 is an isometric view of one of the shear pins;

FIG. 5 is a detail sectional view illustrating removal of a sheared pin; and

DETAILED DESCRIPTION OF THE INVENTION

Figure 1:
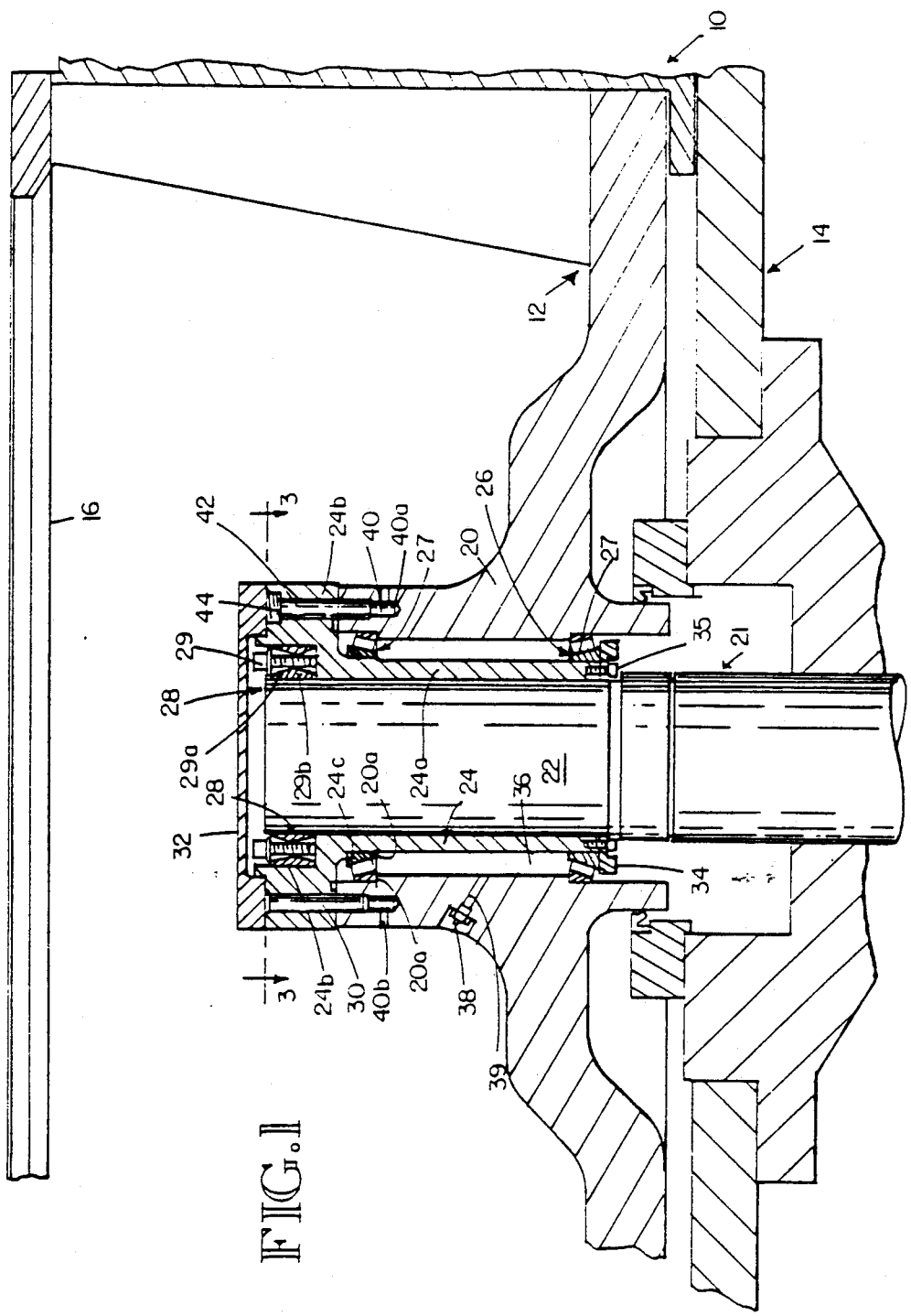
FIG. 1 is a fragmentary longitudinal vertical sectional view through a chip slicing machine and particularly the hub portion of the anvil rotor.
Figure 2:
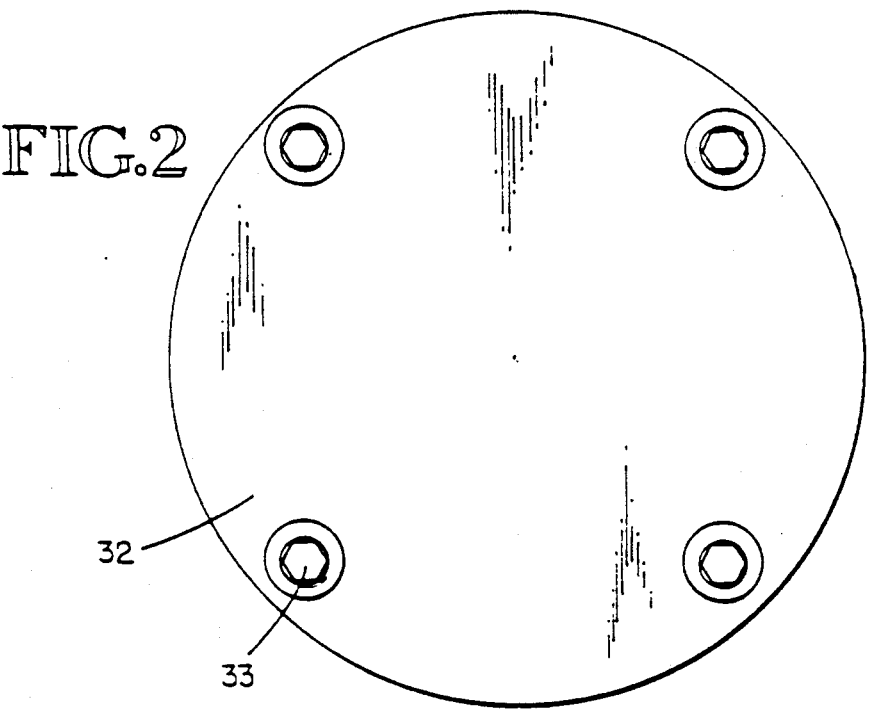
FIG. 2 is a front elevational view of the cover taken as indicated by line 2—2 in FIG. 2.
Figure 3:
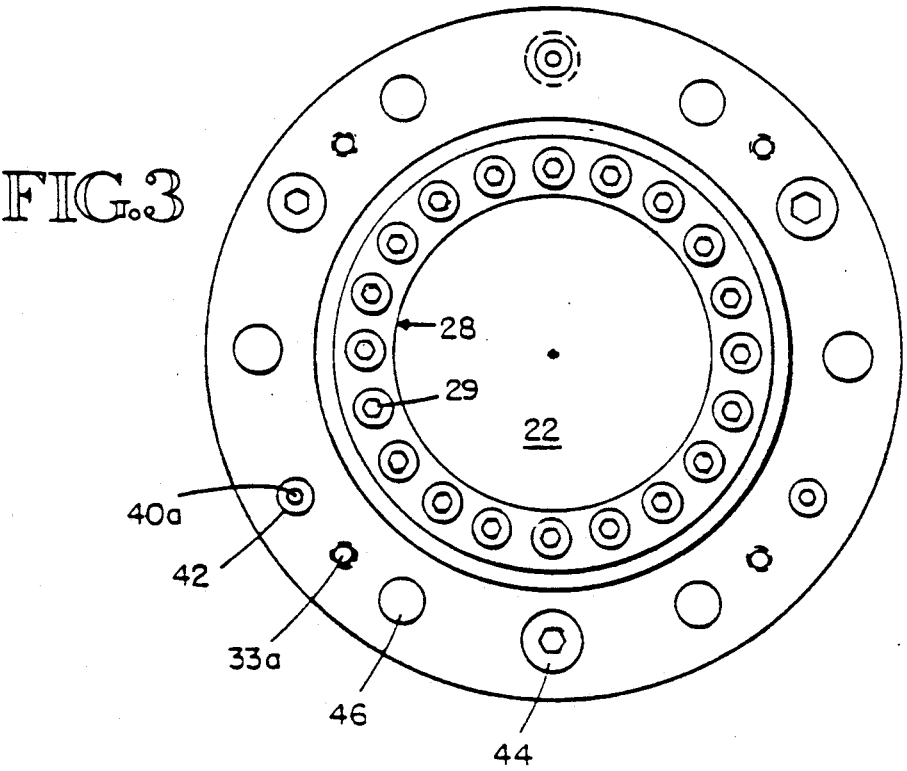
FIG. 3 is a transverse vertical sectional view taken as indicated by line 3—3 in FIG. 2 and with the shear pins removed.
Figure 6:
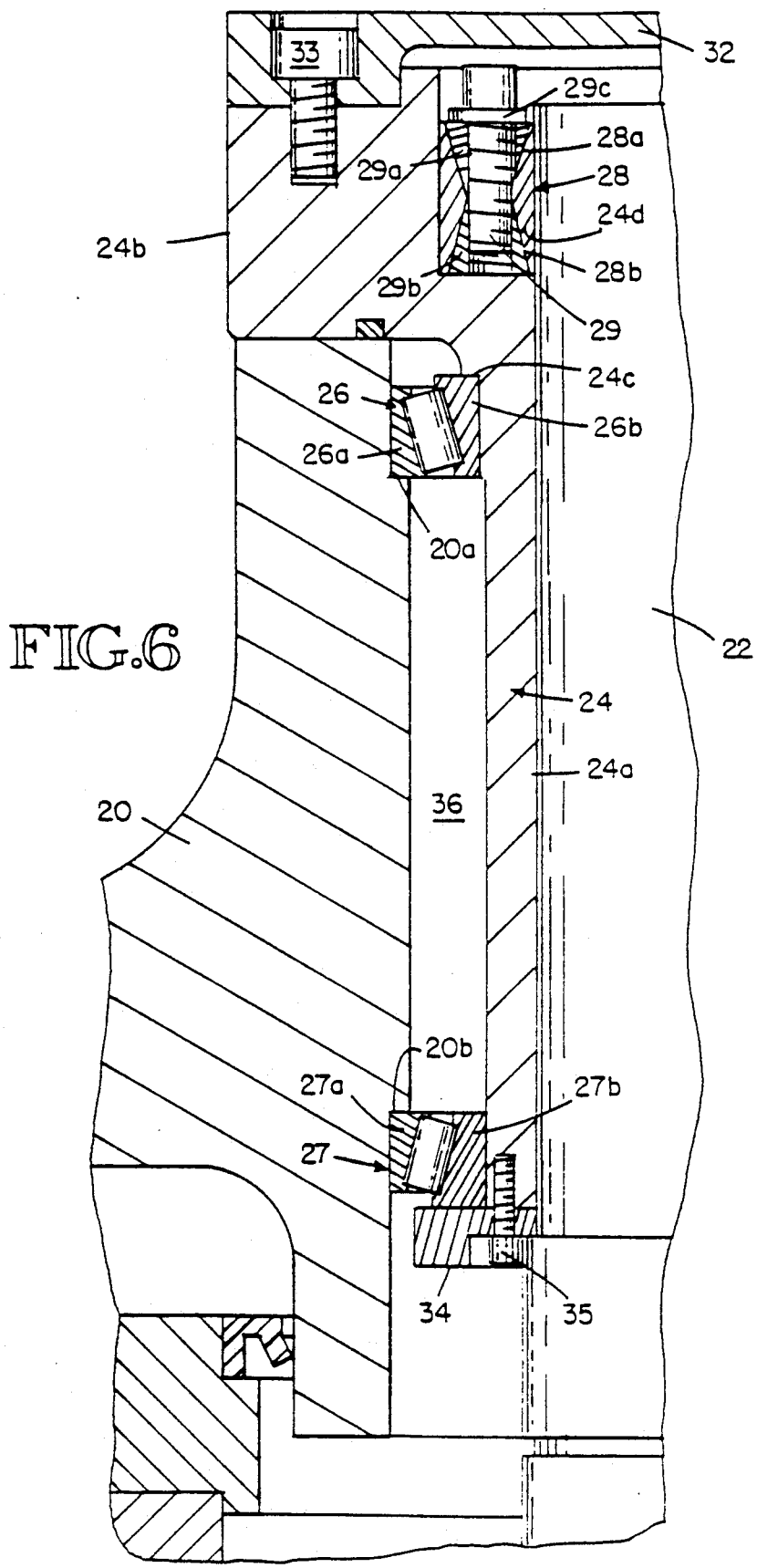
FIG. 6 is an enlarged detail sectional view of a portion of FIG. 1, but with the section taken at one of the holddown bolts for the cover.

Referring to the drawings for purposes of example, the invention is shown applied to a chip slicing machine 10 having a rotor 12 on which anvils are mounted which cooperate with slicing knives on a surrounding rotating drum 14 having discharge ports adjoining the knives. Chips are fed into the machine through a chute and access to the rotor is available through a front door 16. Such a machine is well known in the art.

The rotor 12 has a front hub 20 surrounding a forward journal 22 on a drive shaft 21. In accordance with the present invention, a coupling 24 and two sets of radially loaded bearings 26, 27 are introduced between the rotor hub 20 and the journal 22. An expansion ring 28 is provided to fix the coupling 24 on the journal 22, and shear pins 30 connect the coupling 24 to the rotor hub 20. A front cover plate 32 covers the expansion ring 28 and shear pins 30 and is held in place by screws 33 threaded into holes 33a in the coupling 24. At the rear of the coupling 24, there is provided a retaining ring 34 secured by bolts 35.

Continuing in greater detail, the coupling 24 has a sleeve section 24a and an annular head flange 24b. Front and back annular shoulders 20a, 20b facing forwardly and rearwardly, respectively, are provided as seats for the outer races 26a, 27a of the bearings 26, 27. The sleeve section 24a has a rearwardly facing annular shoulder 24c to engage the outer end of the inner race 26b of the bearings 26. The inner race 27b of the bearing 27 is engaged by the retaining ring 34.

The annular chamber 36 between the bearings 26, 27 may be lubricated by lubricant applied through a fitting 38 communicating with the chamber 36 via a port 39 in the hub 20. Sealing rings are preferably provided between the head flange 24b and forward end face 20c of the hub 20 and between the retaining ring 34 and the inner race of the rear bearing 27.

The front of the coupling 24 is formed with an annular recess 24d for receiving the expansion ring 28. This ring is of standard construction and has a plurality of equally spaced openings, each formed with conical seats 28a, 28b to receive bolts 29, which draw pairs of frustoconical wedges 29a and 29b into engagement with the conical seats 28a, 28b to radially expand the ring 28 in both radial directions and thereby lock the coupling 24 to the journal 22. More particularly, the bolts 29 engage the outer ends of the wedges 29a by a collar 29c and pass through nonthreaded bores in the wedges 29a into threaded engagement with the wedges 29b so that the wedges 29b are drawn toward the wedges 29a and engage the conical seats in the openings 28a when the bolts are tightened.

The hub 20 is formed with a set of six evenly spaced holes 40 which may have rear extension 40a of reduced diameter communicating with the atmosphere by radial access ports 40b. The holes 40 are complemented by a registering set of six evenly spaced holes 42 extending through the head flange 24b of the coupling 24. Alternate of the holes 42 may be counterbored and threaded at their forward ends to receive threaded plugs 44 when not used for shear pins 30. One or more of these extra holes 42 are used for additional shear pins in case the load requires them to avoid pin shearing under normal operating conditions.

The shear pins 30 have a central axial bore 30a adapted to receive a removal tool for pulling out the outer end portion 30b of a sheared pin after the cover 32 has been removed by unscrewing the screws 33. Preferably, the head flange 24b may have one or more through-holes 46 located the same radial distance from the rotary axis of the shaft 22 as the holes 42, but larger in diameter than the holes 42. The function of these larger holes 46 is to assist in easy removal of the inner end portions of the shear pins 30 after the outer end portions have been removed. When this has been accomplished, the rotor 20 is turned so that an enlarged hole 46 in the rotor registers with a hole 40 in the head flange 24b, as shown in FIG. 5. Then the inner end portions 30c of the sheared pins can be easily removed by applying compressed air to the access ports 40b as indicated by arrow 48 in FIG. 5. In the alternative, the hole extensions 40a and related ports 40b may be eliminated and the center bores 30a in the shear pins 30 extended for the full length of the pins so that a removal tool can also be used to remove the inner end portions 30c of the sheared pins. After removal of the sheared pins, the rotor 12 is turned another thirty degrees to realign the holes 42 in the head flange 24b with the holes 40 in the rotor hub 20 so that new shear pins 30 can be inserted.

During normal operation of the chip slicing machine, the rotor 12 is driven by the shaft 22 via the shear pins 30, head flange 24b of the coupling 24, and the expansion ring 28, and the bearings 26, 27 function only to coaxially support the hub 20 of the rotor 12 on the shaft 22 via the sleeve portion 24a of the coupling 24. When an overload condition occurs between the shaft 22 and the rotor 12, the pins are sheared, whereupon the rotor 12 and shaft 22 are free to rotate independently by way of the bearings 26, 27.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:
1. A shaft overload protection system comprising:
   a rotor having a hub with a central bore extending axially from an end face;
   a shaft having a journal in said bore;
   a coupling sleeved on said journal and having a head flange opposing said end face of the hub;
   bearings between said coupling and hub;
   releasable means detachably fixing said coupling relative to said shaft; and
   shear pins extending between said head flange and hub, said shaft being free to turn relative to said rotor via said coupling and bearings in the event that said shear pins are sheared under an overload condition.
2. A system according to claim 1 in which said releasable means comprises an expansion ring engaging said flange and journal.
3. A system according to claim 1 in which said coupling has a sleeve section in said bore extending from said head flange and in which said bearings comprise axially spaced sets of thrust bearings between said sleeve and said bore.
4. A system according to claim 1 in which said shear pins extend through holes in said head flange into registering holes in said hub.
5. A system according to claim 4 in which ports communicate with said inner ends of the registering holes for access to the inner end portions of said shear pins after shearing of the shear pins.
6. A system according to claim 4 in which said head flange has an enlarged hole arranged to register with said registering holes by turning of said rotor after shearing of the shear pins.
7. A system according to claim 1 in which a cover plate is mounted on said hub and covers said end face to retain said shear pins.
8. A system according to claim 2 in which a cover plate is mounted on said hub and covers said shear pins and expansion ring.
9. A system according to claim 1 in which said bearings comprise two sets of axially spaced bearings and in which said hub has a lubrication fitting communicating with an annular chamber between said two sets.
10. A system according to claim 1 in which anvils are mounted on said rotor.
11. A system according to claim 1 in which said hub has axially spaced inner annular shoulders faced axially away from one another, and said coupling has an outer annular shoulder and a retaining ring facing one another and each axially opposing one of said inner shoulders on said hub; and in which said bearings are mounted between said inner shoulders on the hub and said outer shoulder and retaining ring on said hub.
12. A system according to claim 11 in which said retaining ring is mounted on the end of said hub opposite from said head flange, and said hub has an annular recess receiving said releasable means.
13. A system according to claim in which said shear pins have a bore in their outer ends for receiving a removal tool to remove the outer end portion of the shear pins after shearing of the shear pins.
14. A system according to claim 13 in which said head flange has an enlarged pin removal hole arranged to register with the inner end portions of said shear pins after shearing of the shear pins and removal of the outer end portions of the sheared pins.
15. A system according to claim 1 in which each of said shear pins has a bore extending its full length for receiving a removal tool to remove the outer end portion of the shear pins after shearing of the shear pins, and for then again receiving a removal tool in the portion of the bore in the remaining inner end portion of the sheared pins to remove the latter.
16. In a slicing machine of the type having an outer rotary drum with knives and discharge openings:
   an anvil rotor having a hub with a central bore extending between a front face and a back end of the hub;
   a drive shaft for the rotor having a forward journal occupying said bore and spaced radially inward from said hub;
   a coupling having a sleeve section in said bore which is sleeved on said journal and is spaced radially inward from said hub, said coupling having a radially enlarged head flange at the front which opposes said front face of the hub, and having a forwardly exposed annular recess around said journal;
   front and back sets of bearings in said bore between said sleeve and hub, said sleeve and hub being formed with annular shoulders engaged by said bearings so as to prevent endwise relative movement between said coupling and rotor;

expansion ring means in said annular recess for preventing relative rotation between said coupling and shaft;

a front set of holes through said head flange extending in parallel relation to the rotary axis of said shaft, and a registering set of holes in said hub extending rearwardly from said front face thereof to inner ends of said registering sets; and shear pins occupying some of said front set of holes and the corresponding holes in said registering set, said shaft being free to turn relative to said rotor via said coupling and bearings in the event that said shear pins are sheared as a result of jamming of said rotor.

17. In a slicing machine according to claim 15, a cover plate mounted on said hub and covering said front set of holes and said annular recess to retain the shear pins.

18. In a slicing machine according to claim 16, each of said shear pins having a longitudinal bore for receiving a removal tool after shearing of the shear pins.

19. In a slicing machine according to claim 16, an enlarged pin removal hole through said head flange arranged to register with said holes in the hub when said rotor is turned relative to said shaft after shearing of said pins for obtaining better access to the inner end portions of the sheared pins.

* * * * *

UNITED STATES PATENT AND TRADEMARK OFFICE
CERTIFICATE OF CORRECTION

PATENT NO. : 5,029,626

DATED : July 9, 1991

INVENTOR(S) : Donald A. Dean et al.

It is certified that error appears in the above-identified patent and that said Letters Patent is hereby corrected as shown below:

In column 4, claim 13, line 36, after "claim" please insert -- 1 --.

Signed and Sealed this

Nineteenth Day of January, 1993

Attest:

DOUGLAS B. COMER

Attesting Officer

Acting Commissioner of Patents and Trademarks